July 28, 1925.

J. J. LONG 1,547,428

METHOD FOR TREATING TOBACCO LEAF

Filed Nov. 3, 1924

Inventor
John J. Long,

By Cushman, Bryant + Darby
Attorney

Patented July 28, 1925.

1,547,428

UNITED STATES PATENT OFFICE.

JOHN J. LONG, OF NORFOLK, VIRGINIA.

METHOD FOR TREATING TOBACCO LEAF.

Application filed November 3, 1924. Serial No. 747,538.

*To all whom it may concern:*

Be it known that I, JOHN J. LONG, a citizen of the United States, residing at Norfolk, in the county of Norfolk and State of Virginia, have invented new and useful Improvements in a Method for Treating Tobacco Leaf, of which the following is a specification.

The present invention relates to the treatment of tobacco leaf for use as a filler in the manufacture of cigars. In a great many types of leaves the stem is entirely removed from the leaf before incorporation in the cigar and in others only about a third of the stem is retained, for the reason that the remainder of the stem in its natural shape is unwieldy, would impede the drawing of the cigar and produce a comparatively bitter taste. The objection to retaining the stem in the leaf is that it hinders burning of the cigar and has often an offensive taste.

It has been proposed to compress or puncture the stem in order to break down the original structure of the same by separating the fibers and forming air passages or vents. This improves the burning quality of the stem when incorporated in the filler bunch as part of the leaf but does not remove the objectionable taste.

It is an object of the present invention not only to treat the stem in such a way that the same will burn properly but also to eliminate all objectionable taste ordinarily present when the stem is retained.

The invention contemplates the treatment of the leaf and stem in such a way that when the leaf is compressed into the bunch, the stem will not be retained as a unit, but various portions of the same will move into different parts of the bunch or, in other words, will move out of their common plane which they have in the unsevered stem.

I have found that by scattering or disseminating the portions of the stem, which is accomplished by destroying its original integrity or unitary structure in such a way that the several portions of the same will move out of their common plane. As a result, the stem will burn in much the same manner as any other portion of the leaf and give no bitter taste.

Carrying out the invention, the stem is preferably severed or transversely cut at longitudinally spaced points and the adjacent portions of the leaf proper, at the sides of the stem, are cut both longitudinally and transversely so that, between the lines of severance, the stem portions are partially cut away from the body of the leaf sufficiently to permit them to move or be displaced outwardly from their normal position when the leaf is pressed into the bunch.

In addition to severing the stem, as described, and preferably before such treatment, I have found it desirable to compress or flatten the stem to break down its original hard and fibrous structure and thereby increase its combustibility.

In the accompanying drawings, wherein the application of the invention is illustrated:

Figure 1:
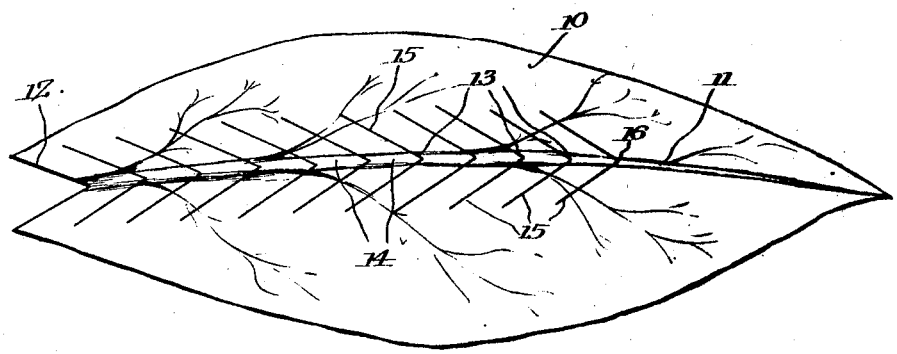
Figure 1 is a face view of a leaf treated as described.

Referring to the drawings more in detail, 10 indicates the body of a tobacco leaf having a stem 11, the projecting end portion of it may be removed to form a substantially triangular cut 12 in one end of the leaf. The portion of the stem at the opposite end is comparatively thin and this thin portion is often retained in the leaf when the same is used as a filler.

Under the present invention the first step in the treatment of the leaf is to suitably compress or flatten the stem and to accomplish this any suitable mechanism may be employed. For example, the leaf may be passed through suitable cam pressing rollers, such as are well known in the art, and require therefore, no detailed description.

This compression or flattening of the stem breaks down its normal hard and fibrous structure, thus facilitating the manipulation of the leaf in the formation of the filler bunch and increasing the combustibility of the stem.

In addition to compressing the stem and preferably thereafter, the same is severed transversely at a plurality of spaced points 13 to form a series of separated stem portions 14. While it is broadly old to sever the stem in order to facilitate tearing of the leaf, the present invention is distinguished from this old expedient by reason of the fact that, in addition to simply cutting the stem, the leaf proper along the sides of the stem is cut in such a way that when the leaf or a portion thereof containing part of the stem is compressed into a filler bunch the severed sections 14 of the stem may move outwardly into different planes from their normal common plane in the unsevered stem. In other words, the gist of the present invention is the cutting of the stem and also the adjacent portion of the leaf, without removing the stem from the leaf, in such a way that the severed stem portions in each leaf or leaf section are embodied in the filler bunch will be displaced into different positions in the bunch. As the original unity of the stem is destroyed and the severed portions thereof are scattered throughout the bunch there will be no offensive or bitter taste which is present when the stem is incorporated in the bunch as a unit.

For the purpose of enabling the stem portions 14 to become displaced from their normal positions, the leaf adjacent the stem may be cut in a number of ways. For example, as indicated in the drawings the leaf at each side of the stem is formed with cuts 15 which extend both transversely and longitudinally of the leaf. Thus the several stem portions or sections 14 are at least partially cut from the leaf at their sides. In the particular application of the method illustrated, the cuts on the same side of the stem are parallel and inclined relative to the stem; the cuts on the opposite side of the same stem section meeting at substantially the longitudinal center of the stem. As will be noted, the two cuts for each section constitute substantially two sides of a triangle, the apex 16 of which is in the stem.

Figure 2:
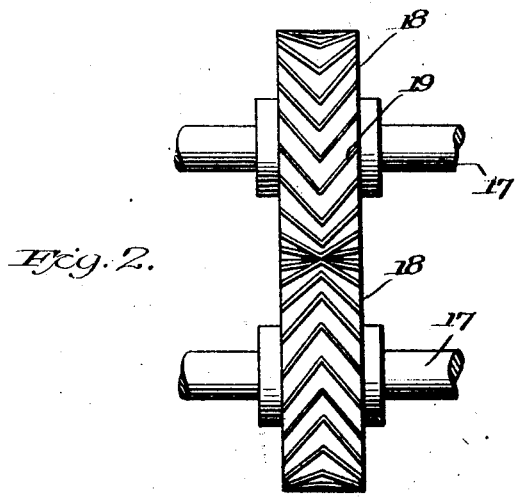
Figure 2 is an elevational view of a suitable means for cutting the leaf after the stem has been compressed.

In severing the stem and cutting the leaf any suitable means may be employed and as illustrative of such mechanism there is shown in Figure 2 a pair of substantially parallel shafts 17 adapted to be driven from any suitable source of power and carrying rollers 18, the peripheries of which have cutting blades 19 shaped to form suitable cuts in the leaf. The blades of one roller are adapted to fit between the adjacent blades of the other roller for this purpose.

Obviously, the invention is not limited to the precise form of leaf cuts shown, it simply being essential that the leaf be treated in such a way that the stem portions 14 may be moved outwardly when the leaf or a portion thereof having a stem is compressed into the filler bunch.

I claim:

1. The method of treating tobacco leaves for use in a filler bunch, which consists in severing the stem transversely at a plurality of points and forming cuts in the leaf at the sides of the stem which extend transversely and longitudinally of the leaf, the stem being retained in the leaf, whereby when the leaf is compressed into the bunch the several separated portions of the stem will move out of their normal common plane in the unsevered stem.

2. The method of treating tobacco leaves for use in a filler bunch, which consists in compressing the stem, severing the stem transversely at a plurality of points and forming cuts in the leaf at the sides of the stem which extend transversely and longitudinally of the leaf, the stem being retained in the leaf, whereby when the leaf is compressed into the bunch the several separated portions of the stem will move out of their normal common plane in the unsevered stem.

3. The method of treating tobacco leaves for use in a filler bunch, which consists in severing the stem at a plurality of points with cuts which extend a substantial distance into the leaf both sides of the stem, said cuts being of sufficient length whereby, when the leaf is compressed into the bunch, the several separated portions of the stem will move out of alignment.

In testimony whereof I have hereunto set my hand.

JOHN J. LONG.